United States Patent
Takeda

[19]

[11] Patent Number: 6,036,367
[45] Date of Patent: Mar. 14, 2000

[54] SLIDER ASSEMBLY

[75] Inventor: Kouji Takeda, Gifu-ken, Japan

[73] Assignee: Nippon Thompson Co., Ltd., Tokyo, Japan

[21] Appl. No.: 09/135,802

[22] Filed: Aug. 18, 1998

[51] Int. Cl.[7] .................................................. F16C 29/06
[52] U.S. Cl. ............................................................ 384/45
[58] Field of Search ................................ 384/45, 44, 43; 464/168

[56] References Cited

FOREIGN PATENT DOCUMENTS

| 5-027337 | 4/1993 | Japan . |
| 9-004640 | 1/1997 | Japan . |

Primary Examiner—Lenard A. Footland
Attorney, Agent, or Firm—Brody and Neimark

[57] ABSTRACT

This slider assembly has a stopper of one-piece structure that prevents the slider from coming off the rail member and which can easily be attached to and removed from the rail member and be manufactured at low cost. The slider of the slider assembly that can slide relative to the track rail is prevented by the stopper from coming off the track rail. The stopper comprises an embracing portion that embraces the slider on one side of the track rail and locking portions provided at both ends of the embracing portion. The embracing portion comprises a pair of leg portions and a bridge portion, and the locking portions each include a bent portion and a hook portion. The hook portions engage in the engagement portions as engagement holes formed in the track rail.

10 Claims, 5 Drawing Sheets

SLIDER ASSEMBLY

BACKGROUND OF THE INVENTION

1. Field of the Invention

The present invention relates to a slider assembly that prevents a slider from coming off rail members, such as track rails, dummy track rails or insertion sleeves, during the transport and assembly of the slider for use in a linear-motion rolling guide unit applied to linear sliding portions of such equipment as machine tools, assembling apparatuses, test equipment.

2. Description of the Prior Art

Advances of mechatronics technology have been remarkable in recent years and the fundamental and versatile equipment supporting such a technology include linear-motion rolling guide units. The linear-motion rolling guide units are currently used by being incorporated in equipment of various fields including machine tools, semiconductor fabrication equipment, transport equipment and industrial robots. The linear-motion rolling guide units are finding an ever widening range of applications as the technology advances and there are growing demands for an easy-to-handle linear-motion rolling guide units.

A conventional linear-motion rolling guide unit as shown in FIG. 10 has first raceway grooves 24 formed on longitudinal sidewall surfaces 23, 23, thereof on both sides of a track rail 22. A slider 21 is mounted astride the track rail 22 and freely slides on the track rail 22 with rolling elements 27 circulating along the first raceway grooves 24. The track rail 22 is formed in its longitudinal upper surface 34 with mounting holes 33 spaced from each other. The slider 21 has a casing 25 movable relative to the track rail 22 and end caps 26 mounted to the longitudinal ends of the casing 25. The casing 25 has return passages 31 formed therein in which the rolling elements 27 roll and circulate. The casing 25 is formed in its upper surface with threaded holes 39 for mounting other devices and components. The casing 25 and the end caps 26 are formed at their undersides with recessed portions 30 so that the casing 25 and the end caps 26 can move astride the track rail 22. The recessed portions 30 are formed with raceway grooves 29 at positions opposing the first raceway grooves 24 of the track rail 22. The raceways formed by the opposing raceway grooves 24 and 29 accommodate the rolling elements 27 such as balls and cylindrical rollers so that they can move rolling in the raceways. To prevent the rolling elements 27 from coming off the casing 25, the casing 25 has retainer bands 38 enclosing the rolling elements 27. Bolts are inserted through the mounting holes 33 formed in the longitudinal upper surface 34 of the track rail 22 and screwed into threaded holes formed in a mounting body (not shown), such as bed, bench and machining table, to securely mount the track rail 22 on the mounting body.

The end caps 26 have formed on both sides thereof with claws to scoop the rolling elements 27 from the first raceway grooves 24—the loaded raceways that face the track rail 22—and direction change passages to change the direction of travel of the rolling elements 27 for circulation. The end caps 26 have end seals 37 attached thereto that seal between the track rail 22 and the longitudinal ends of the slider 21, and grease nipples 40 for supplying a lubricant to the raceways formed by the raceway grooves 24 and 29 of the track rail 22 and slider 21. The end caps 26 are secured to the longitudinal ends of the casing 25 by screws 42 inserted through mounting holes. The rolling elements 27 running loaded along the raceway grooves 24 of the track rail 22 are led into the direction change passages formed in the end caps 26, and then move into the return passages 31 formed parallel to the raceway grooves 29 of the casing 25. Thus the rolling elements 27 continuously travel in endless circulation passages. The rolling motion of the rolling elements 27 loaded between the raceway grooves 24 formed in the track rail 22 and the raceway grooves 29 formed in the slider 21 allows a smooth relative motion between the track rail 22 and the slider 21.

The conventional linear-motion rolling guide unit has been marketed with the slider 21 mounted astride the track rail 22 or in a preset condition, as shown in FIG. 10. In the actual operation, too, a combined set of the slider 21 and the track rail 22 has been in use. As demands for the linear-motion rolling guide unit have expanded progressively, they have also diversified and come to include interchangeability as a means for facilitating handling. Because of a high level of precision management established for manufacturing and assembly, it has been possible these days to combine an arbitrary track rail with an arbitrary slider, provided they are compatible with each other in the engagement specification. Under these circumstances, the track rails and the sliders are separately sold to meet the needs for replacing only the slider while using the existing track rail, or vice versa.

During their storage, sale and assembly, the interchangeable sliders are not handled alone but are combined, as a set, with track rail-shaped rail members inserted into the sliders for the protection and prevention of the rolling elements in the sliders from getting dislocated. When a small number of interchangeable sliders are handled, it is possible to use the rail members or dummy track rails that have the same materials and specifications as the real track rails on which the interchangeable sliders are to be mounted. When a large number of interchangeable sliders are handled, however, insertion sleeves instead of the dummy track rails are used which are molded from resin or the like in shapes resembling the dummy track rails because manufacturing the dummy track rails will raise cost. An insertion sleeve 52 is an elongate body of an appropriate length having a hollow portion 53 therein as shown in a cross section of FIG. 13. The insertion sleeve 52 has escape grooves 55 formed in longitudinal sidewall surfaces 54 on both sides. The escape grooves 55 do not need to sustain the loads acting on the linear guide unit but have upper and lower rolling contact portions 56 arc-shaped in cross section that are in contact with rolling elements 57 shown by imaginary lines. The areas between the upper and lower rolling contact portions 56 form the escape grooves 55 accommodating the retainer bands 38 and constituting non-contact portions.

The user who purchased the set of the slider 21 mounted on the insertion sleeve 52, as shown in FIG. 12, puts the insertion sleeve 52 against the end of the real track rail 22 on which to fit the slider 21 and slides the slider 21 from the insertion sleeve 52 onto the track rail 22. This allows the slider 21 to be moved from the insertion sleeve 52 to the track rail 22 without the rolling elements 57 falling from the slider 21.

Small linear-motion rolling guide units do not have ball retaining means such as retainer bands 38 and thus pulling the slider from the track rail results in balls or rolling elements contained in the slider falling out of the slider. To avoid this, it is proposed to use a dislocation prevention device with some strength in the track rail. Conventional dislocation prevention devices for the linear guide units include, for example, a stopper device shown in FIG. 11, which comprises rubber stoppers 45 fitted in the mounting holes 33 that are formed at the ends of the track rail 22 in the linear-motion rolling guide unit shown in FIG. 10 and through which the track rail mounting bolts are to be inserted. When the slider 21 is about to move beyond the track rail 22, the slider 21 physically abuts against the rubber stoppers 45 and stops. In a track rail too short for the mounting holes 33 to be formed at the ends of the track rail 22, it is conventional practice to fit rubber O-rings (not shown) at the ends of the track rail 22 to work as the stoppers.

A stopper device for the linear guide unit disclosed in Japanese Patent Laid-Open No. 4640/1997 comprises: notches crossing widthwise the upper or lower surface of the guide rail at the end portions of the guide rail, which has rolling element grooves axially extending on a pair of longitudinal sidewall surfaces thereof; and engagement members fitted in the notches and at least partly projecting from the outer surface of the guide rail to engage the slider. The engagement members are inserted into the notches of the guide rail for a single operation mounting. Because the slider abuts against the stopper device, the slider is prevented from overrunning and coming off the ends of the guide rail. The stopper device may be made of a steel wire or steel plate or a plate member of synthetic resin.

A linear-motion rolling guide unit disclosed in the Japanese Utility Laid-Open No. 27337/1993 has stoppers that are mounted to or dismounted from the track rail by vertical pushing or pulling. The stoppers are so shaped that the distance between their locking legs at the ends of a stopper body is set smaller than the distance between the raceway grooves for the rolling elements formed at both sidewall surfaces of the track rail. When the locking legs are fitted between the raceway grooves, an elastic deformation of the stopper body brings a part of its inner surface into elastic contact with a part of the top surface of the track rail. The stopper is fitted by vertically pushing it onto the track rail and removed by vertically pulling it off. The engagement of the locking legs is achieved by using bolt holes and recessed grooves or the like formed in the top surface of the track rail.

The above dislocation prevention device for the linear-motion rolling guide unit has its locking portions bent and given a certain strength so that the dislocation prevention device can work as a stopper even when the slider strikes it at significantly high speeds. Hence, the dislocation prevention device has drawbacks that attaching and removing the stoppers requires a force and that it has been difficult to reduce manufacture cost. Further, the conventional stoppers require forming notches at the end portions of the guide rail and are fixedly secured to the notches and the raceway grooves. Therefore, if such stoppers are applied as it is to a longitudinally intermediate part of the guide rail, the notches will reduce the strength of the guide rail and can score the raceway grooves when the stoppers are attached to or removed from the raceway grooves or while held in the raceway grooves. In the dislocation prevention devices in which rubber stoppers are fitted in the mounting holes formed at the end portions of the track rail through which the mounting bolts are to be inserted, or in which rubber O-rings are attached to the ends of the track rail, the rubber stoppers and O-rings may get dislocated from the mounting holes or track rails by impacts. Increasing the press fit with which the rubber stoppers are fitted into the mounting holes or using O-rings with greater strengths to prevent the stopper devices from coming off the track rail will make the mounting of the rubber stoppers and the rubber rings to the mounting holes and track rail difficult. Further, the conventional stoppers need to be installed on both sides of the slider with respect to the sliding direction. Under these circumstances, there are growing demands for a slider assembly which, as the dislocation prevention device for preventing the slider from coming off the rail member, uses stoppers having a simpler structure, easy to be attached and removed and less costly to manufacture, and which can be reliably held in the track rail to work as a stopper even when the track rail is short.

SUMMARY OF THE INVENTION

The object of this invention is to solve the problems described above and to provide a slider assembly which can prevent dislocation of the slider of the linear-motion rolling guide unit, which can reduce the manufacture cost of a stopper by bending a wire or strip material into the stopper, which allows easy mounting and dismounting of the stopper to and from the rail member simply by engaging or disengaging the locking portions formed at the ends of the stopper into or from the engagement portions of the rail member, and which can reliably prevent the slider by a single stopper from coming off the rail member in the sliding direction.

The present invention relates to a slider assembly which comprises: a rail member having first raceway grooves; a slider having second raceway grooves corresponding to the first raceway grooves and mounted on the rail member so as to be slidable relative to the rail member; and stoppers attached to the rail member; wherein the stoppers include embracing portions extending from one of front and rear end faces, with respect to a slider's sliding direction, of the slider to the other end face so as to embrace the slider and locking portions provided at both ends of the embracing portions and adapted to engage in engagement portions of the rail member; wherein the slider is stopped on the rail member when it abuts against the stopper.

Because of the construction of the slider assembly described above, the stopper can be formed in a simple construction comprising an embracing portion extending to embrace the slider and locking portions at both ends of the embracing portion. The stopper can be fabricated at low cost by performing simple bending works on the wire or strip material. The stopper can be attached to and removed from the rail member easily by the simple operation of engaging the locking portions of the stopper in the engagement portions of the rail member or by reversing this operation. This simple operation for stopper attaching and removing ensures reliable prevention of dislocation of the slider. Further, because the embracing portion with its ends engaged in the rail member engages the front and rear end faces, with respect to the slider's sliding direction, of the slider, a single stopper can prevent the slider from being dislocated in any direction.

The slider has a recessed portion which is formed with second raceway grooves at the opposing surfaces. The rail member is an insertion member that is slidably inserted through the recessed portion and which has first raceway grooves formed at paired longitudinal sidewall surfaces. That is, the slider assembly of this invention has the slider mounted astride the rail member as an insertion member.

The embracing portion of the stopper extends from one end face of the slider to the other end face on one side of the rail member. In other words, the stopper is arranged on one side of the rail member. Alternatively, the embracing portion of the stopper extends from one end face of the slider on one side of the rail member to the other end face of the slider on the other side of the rail member. In other words, the stopper diagonally crosses the upper surface of the slider.

The embracing portion comprises a pair of leg portions extending downward at the front and rear end faces, with respect to the slider's sliding direction, of the slider and a bridge portion integrally connecting the paired leg portions and extending astride the upper surface of the slider. The locking portions comprise bent portions bent at the leg portions and extending along the underside of the rail member and hook portions provided at free ends of the bent portions. That is, the embracing portion of the stopper embraces the front and rear end faces, with respect to the slider's sliding direction, of the slider and the upper surface of the slider by the paired leg portions and the bridge portion. To prevent the embracing portion from disengaging from the rail member, the locking portions have hook portions at the free ends of the bent portions, the bent portions being bent at the leg portions and extending along the underside of the rail member. When the stopper is about to rotate about the hook portions, the bridge portion engages the upper surface of the slider, blocking the rotation of the stopper. Hence, the stopper will not disengage from the rail member through rotation.

The engagement portions of the rail member are engagement holes formed at the underside of the rail member, and the locking portions are projections adapted to engage in the engagement holes. When the engagement portions of the rail member are provided by the engagement holes formed at the underside of the rail member, no protruding portions need to be formed at the underside of the rail member, assuring the flatness of the underside of the rail member even during the storage and transport of the slider assembly. When the rail member, like a track rail, is to be mounted to equipment, the flatness of the underside of the rail member is particularly important. When the hook portions formed at the free ends of the bent portions of the locking portions are formed as projections that engage in the engagement holes, the diameter and thickness of the stopper is preferably set small. With this arrangement, if the stopper is present at the underside of the rail member during transport and storage, it will produce almost no adverse effect on the rail member.

The rail member is either a track rail, a dummy track rail, or a molded rail member made of synthetic resin and the like. An appropriate rail member can be employed according to the functions required of the slider assembly. The rail member may directly use an actual track rail with which the slider is originally intended to be combined, or, if the number of sliders are small, may use a dummy track rail that has almost the same structure as the track rail. Alternatively, when a large number of sliders are handled together with many rail members, molded rails may be used which are molded from synthetic resin. The molded rails may be formed as hollow insertion sleeves.

The engagement holes double as the mounting holes formed in the track rail. That is, when the rail member is a track rail, the track rail is mounted on such devices as table and stand. The track rail mounting is achieved by mounting bolts that are passed through the mounting holes formed at predetermined intervals in the track rail. During the storage or transport of the slider assembly using the stopper before the track rail mounting, the track rail is not mounted by using the mounting holes, and therefore the mounting holes can be used as the engagement holes for engagement with the projections or the hook portions of the stopper, eliminating the need to form dedicated engagement holes for the stopper.

The stopper is made of an elastically deformable wire which can easily be worked into any desired shape by bending. The fitting and removing of the stopper can be done easily by utilizing the elastic deformation of the stopper itself.

Further, the slider comprises a casing having the second raceway grooves, rolling elements rolling to travel between the first raceway grooves and the second raceway grooves, end caps secured to both end faces of the casing, and end seals attached to end faces of the end caps. The slider containing the rolling elements can be expected to smoothly slide relative to the rail member. The slider, if it should come off the rail member, may become unusable because in that case the rolling elements will be scattered from the slider. With this slider assembly, however, the stopper prevents the slider from coming off the rail member during the storage and transport of the slider containing the rolling elements before the slider is incorporated into the actual equipment. This is possible at low cost while maintaining a high level of ease with which the slider can be mounted to and dismounted from the rail member.

Because of the above construction of the slider assembly, when the slider is moved in either direction, a single stopper can prevent the slider from disengaging in either direction. Therefore, there is no need to provide at least two stoppers on both sides of the slider with respect to the slider's sliding direction, as was required by the conventional stoppers. Because of the simple structure of the stopper, in which the embracing portion has a pair of leg portions and a bridge portion and the locking portions each comprise a bent portion and a hook portion, the stopper can be manufactured inexpensively simply by performing simple work such as bending on the wire or strip materials. Further, the engagement portions in which the hook portions engage can be fabricated by a simple process of forming holes in the rail member. The attaching and removing of the stopper to and from the rail member and slider can be done by a simple operation of engaging the hook portions of the stopper into the engagement portions formed in the rail member while utilizing the elastic deformation of the wire or strip materials forming the stopper, or by reversing this operation. Thus, a simple mounting and dismounting of the stopper to and from the rail member is assured.

Conventional stoppers are securely fitted into notches formed at the end portions of a guide rail and into the raceway grooves. This construction, however, has a drawback that the notches will lower the strength of the guide rail and can also score the raceway grooves when the stoppers are attached to or removed from the raceway grooves or while held in the raceway grooves. With this slider assembly of this invention, however, because the raceway grooves of the rail member are not used for mounting the stopper, there is no possibility of lowering the strength of the rail member or scoring the raceway grooves even when the stopper is attached to a longitudinally intermediate part of the rail member.

DETAILED DESCRIPTION OF THE EMBODIMENT

Figure 10:
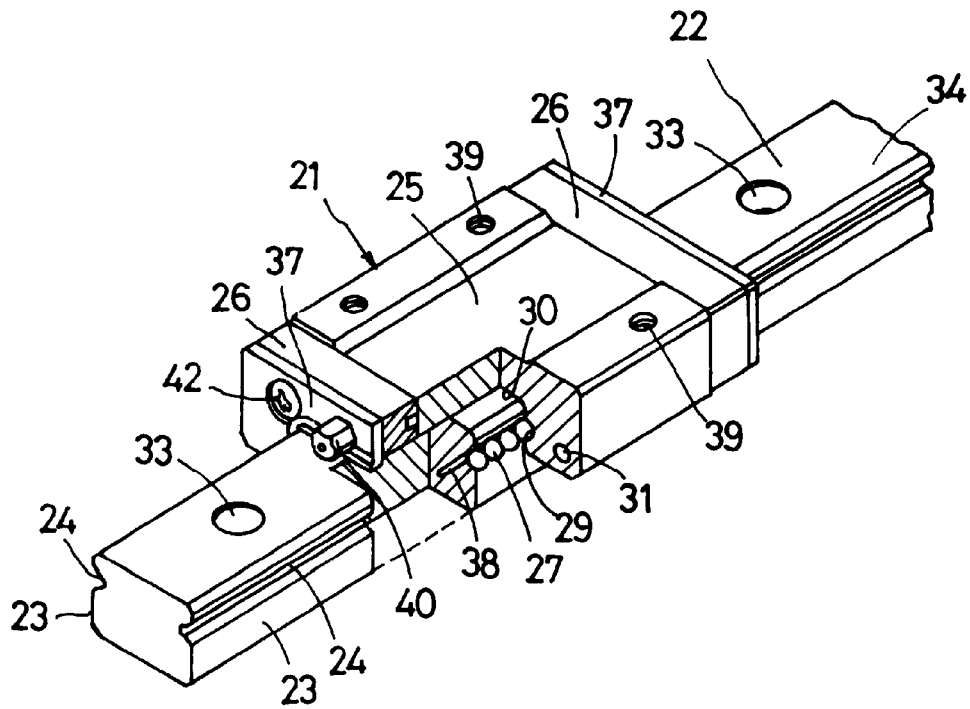
FIG. 10 is a perspective view, partly cutaway, of one example of a conventional linear-motion rolling guide unit.
Figure 11:
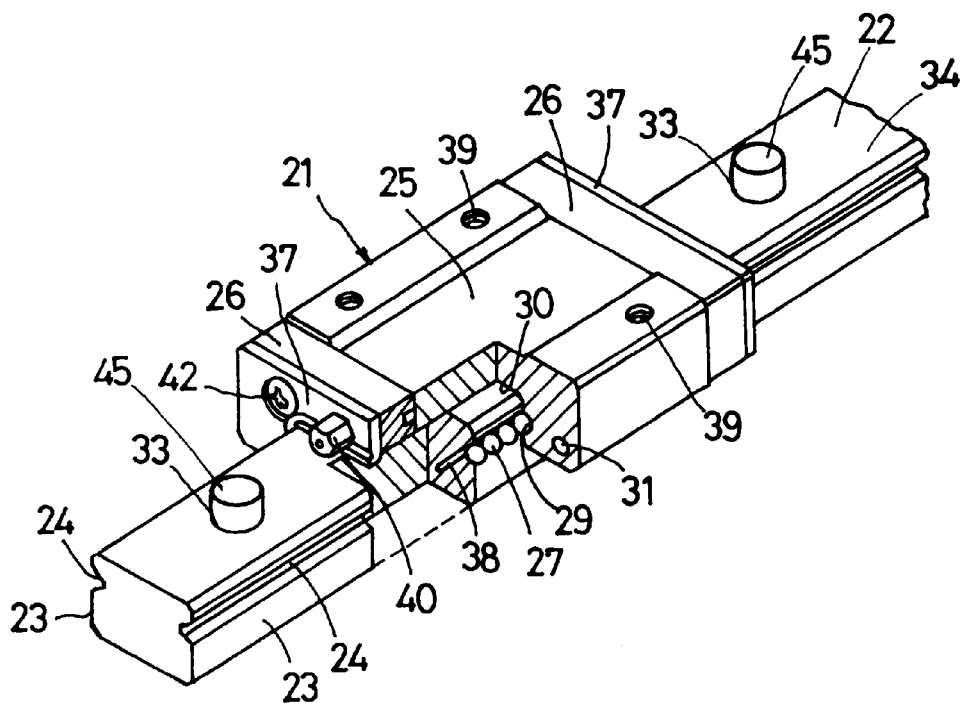
FIG. 11 is a perspective view, partly cutaway, of the conventional linear-motion rolling guide unit using stoppers.

Referring to the accompanying drawings, embodiments of the slider assembly of this invention will be described. In the drawings those parts constituting the slider assembly of this invention which have the same structures and functions as those of the corresponding parts of the conventional linear-motion rolling guide unit shown in FIG. 10 (or FIG. 11) are assigned like reference numerals, and their repetitive explanations omitted.

A slider assembly 1 comprises a slider 21 and a track rail 22 as a rail member inserted through the slider 21. The slider 21 may be of the same structure as the slider 21 shown in FIGS. 10 and 11. The slider 21 basically comprises: a casing 25 having raceway grooves 29 (second raceway grooves, see FIGS. 10 and 11) formed in opposing surfaces of a recessed portion 30; rolling elements 27 (see FIGS. 10 and 11) rolling to travel between the raceway grooves 29 and raceway grooves 24 (first raceway grooves) formed in the track rail 22 at positions facing the raceway grooves 29; end caps 26 secured to the end faces of the casing 25, respectively; and end seals 37 attached to the end faces of the end caps 26. The slider 21 is slidable relative to the track rail 22.

Figure 1:
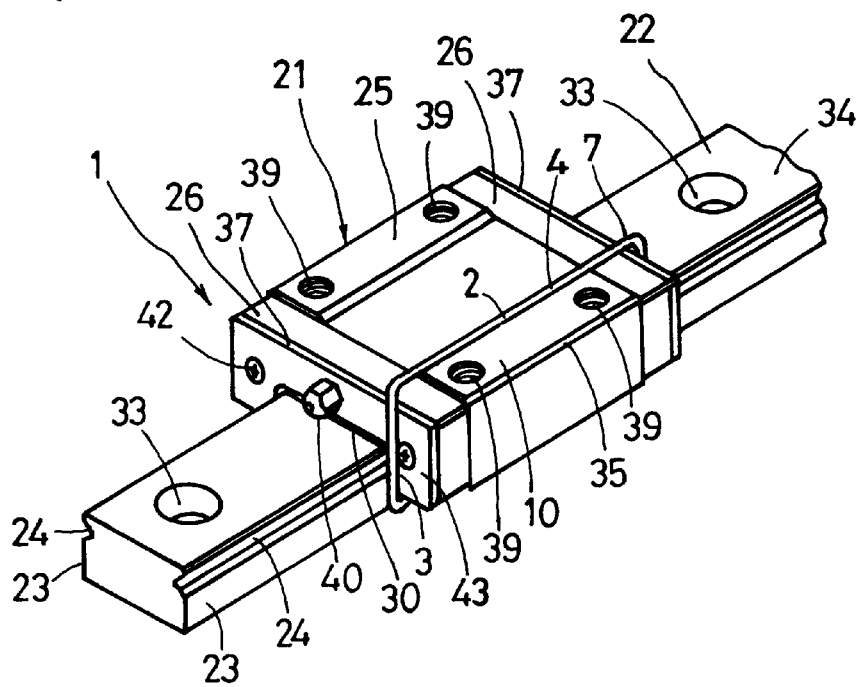
FIG. 1 is a perspective view of one embodiment of a slider assembly of the present invention.
Figure 2:
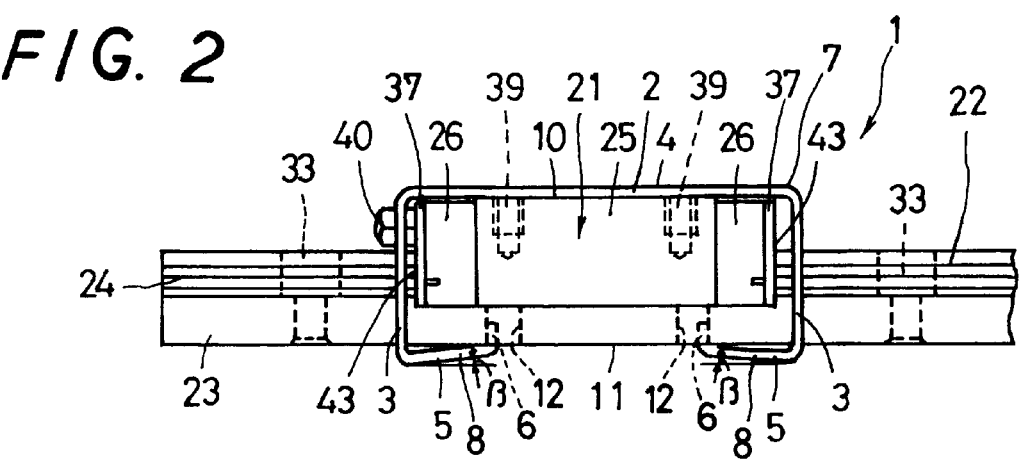
FIG. 2 is a side view of the slider assembly of FIG. 1.
Figure 3:
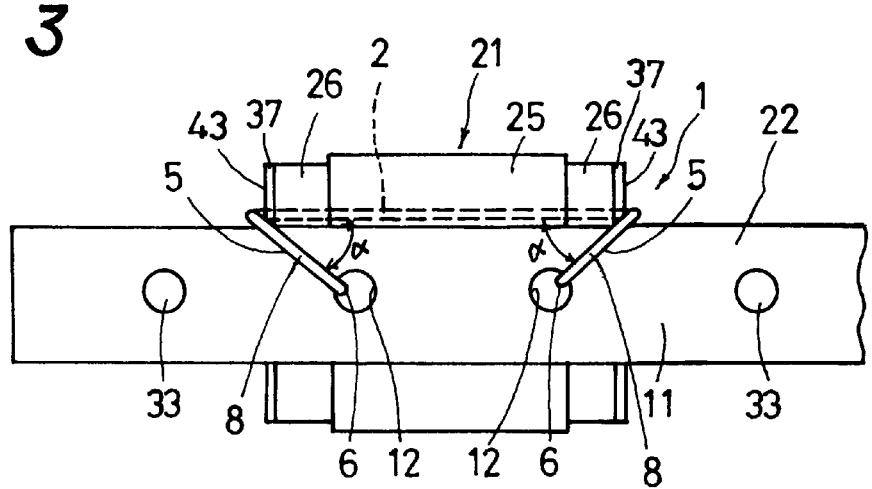
FIG. 3 is a bottom view of the slider assembly of FIG. 1.
Figure 4:
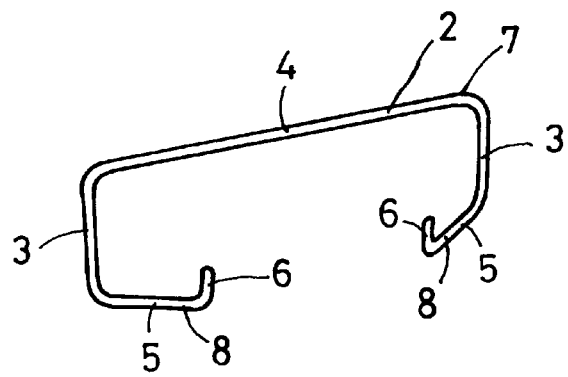
FIG. 4 is a perspective view of a stopper applied to the slider assembly of FIG. 1.

In the slider assembly 1 shown in FIGS. 1 to 3, a stopper 2 for preventing the slider 21 from coming off the track rail 22 is arranged along one side portion of the track rail 22. The stopper 2, as shown in FIGS. 1 to 3 and as shown wholly in a perspective view of FIG. 4, has an embracing portion 7 which includes a pair of leg portions 3 extending downward at the end faces 43 of the end seals 37 of the slider 21 and a bridge portion 4 that integrally connects one end of each of the paired leg portions 3 with each other and extends astride an upper surface 10 of the slider 21. At the ends of the embracing portion 7, the stopper 2 has locking portions 8, each of which includes a bent portion 5 formed by bending the other end of each leg portion 3 and a hook portion 6 formed at a free end of the bent portion 5. The stopper 2 is made of an elastically deformable metal wire material or steel wire.

The embracing portion 7 is bent so that it lies in one and the same plane. The bridge portion 4 and the paired leg portions 3 are formed in the same plane. The length of the leg portions 3 is set slightly longer than the distance from the underside 11 of the track rail 22 to the upper surface 10 of the slider 21. The length of the bridge portion 4 is set slightly longer than the length of the slider 21. The pair of bent portions 5 are each bent inwardly of the track rail 22 at the other end of the leg portion 3 but are not parallel to the bridge portion 4 and, as best shown in FIG. 3, bent at an angle (in the example shown, at an angle α of about 45 degrees, as shown in FIG. 3) toward the track rail 22. Further, the paired bent portions 5 are bent so that they approach the bridge portion 4 toward their free ends (in the example shown, they are bent at an angle β of about 5 degrees, as shown in FIG. 2). The hook portions 6 are formed by further bending inwardly the free ends of the bent portions 5, i.e., by bending the free ends parallelly to the leg portions 3 to form the front ends as projections.

The underside 11 of the track rail 22 is formed with a pair of engagement portions 12 in the form of holes in which the hook portions 6 of the stopper 2 engage. The engagement portions 12 double as the mounting holes 33 used for mounting the track rail 22 to a table or stand. The mounting holes 33 are sufficiently larger in diameter than the wire material of the hook portions 6, so that the hook portions 6 can easily be fitted or removed. The engagement holes for the hook portions 6 may be formed as dedicated engagement holes. In that case, the engagement portions 12 need only to be deep enough to receive the hook portions 6 as the projections of the stopper 2. The bent portions 5 are arranged along the underside 11 of the track rail 22. Because the stopper 2 is made of a wire, it will not score or destabilize the track rail 22 if the track rail 22 is placed on floor or table.

In the slider assembly 1, because the stopper 2 has a simple structure comprising the pair of leg portions 3, the bridge portion 4, the bent portions 5 and the hook portions 6, the stopper 2 can be manufactured inexpensively simply by bending a metal wire. Further, since the engagement portions 12 can be formed in the track rail 22 simply in the form of the engagement holes, the cost of fabricating the engagement portions 12 is low.

The stopper 2 is formed so that the embracing portion 7 embraces the slider 21, with the leg portions 3, the bridge portion 4 and the bent portions 5 elastically deformed to allow quick and easy mounting and removal of the stopper 2. For example, one of the hook portions 6 is engaged in one of the engagement portions 12 of the track rail 22 and one bent portion 5, the paired leg portions 3 and the bridge portion 4 are roughly wound around the track rail 22 and the slider 21. While elastically deforming the bridge portion 4, the leg portions 3 and the other bent portion 5, the other hook portion 6 is engaged in the other engagement portion 12 of the track rail 22 to hold the slider 21 with the embracing portion 7 and then attach the slider 21 to the track rail 22 by the locking portions 8. Alternatively, the stopper may also be installed by engaging the pair of hook portions 6 in the engagement portions 12 of the track rail 22, and then rotating the paired leg portions 3 and the bridge portion 4 about the two positions where the hook portions 6 are engaged in the engagement portions 12 until they pass over the edge 35 of the slider 21 (see FIG. 1) through elastic deformation of the stopper 2. The stopper 2 can be removed from the slider assembly by reversing the above procedure.

The stopper 2, with its components formed with dimensional margins, will embrace the slider 21 loosely. The hook portions 6 can also be made to engage the track rail 22 loosely as by forming the mounting holes 33 sufficiently larger in diameter than the hook portions 6, as described above. When the stopper 2 loosely embraces the slider 21 and holds it to the track rail 22, the attaching and removing of the stopper 2 can be done by displacing the stopper 2 by as much as the dimensional margin, causing necessary elastic deformations to the leg portions 3, the bridge portion 4 and the bent portions 5. This will reduce the amount of deformation of the stopper required for its mounting and dismounting.

In the slider assembly 1 assembled as described above, when the slider 21 slides along the track rail 22 in either direction, the slider 21 abuts against one of the leg portions 3 of the single stopper 2. Because the hook portion 6 on the side of the leg portion 3 struck by the slider 21 engages the engagement portion 12 of the track rail 22 and does not come off the track rail 22, the slider 21 is stopped on the track rail 22 with the leg portion 3 engaging the end face 43 of the end seal 37. Hence, the slider 21 does not fall from the end of the track rail 22. When one of the leg portions 3 of the stopper 2 abuts against the end face 43 of the end seal 37, a force acts in a direction that lifts the other leg portion 3 through the bridge portion 4. This force causes the hook portion 6 corresponding to the other leg portion 3 to engage more deeply in the engagement portion 12 of the track rail 22, making it impossible for the stopper 2 to disengage from the track rail 22. The slider 21, especially the one containing the rolling elements 27, if it should come off the track rail 22, may become unusable because in that case the rolling elements 27 will be scattered from the slider 21. With this slider assembly 1, however, the stopper 2 prevents the slider 21 from coming off the track rail 22 and therefore the rolling elements 27 from being scattered away during the storage and transport of the slider 21 before the slider 21 is incorporated into the actual equipment.

Figure 5:
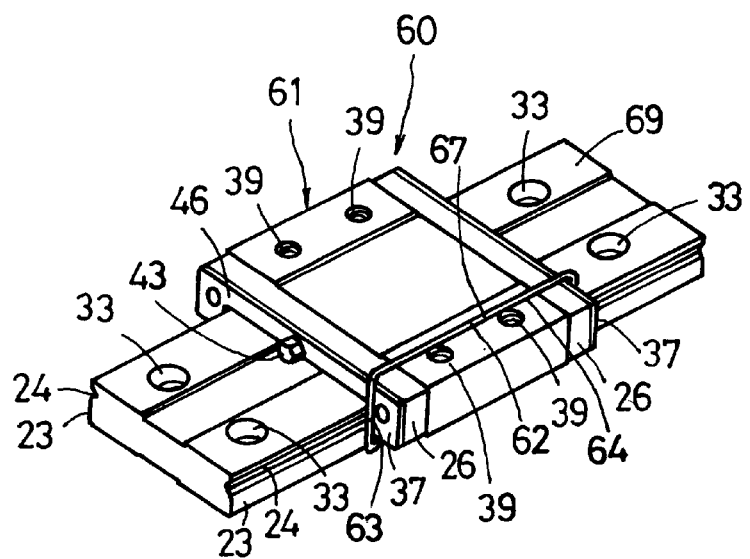
FIG. 5 is a perspective view of another embodiment of the slider assembly of this invention.
Figure 6:
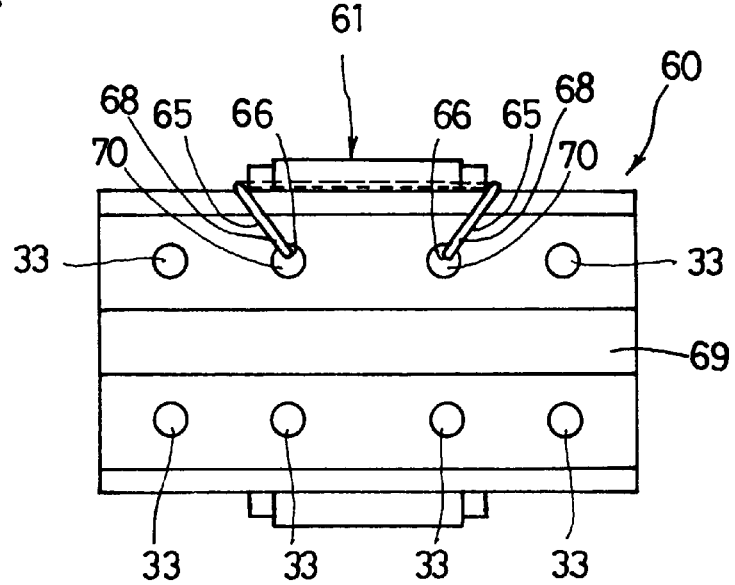
FIG. 6 is a bottom view of the slider assembly of FIG. 5.

Next, by referring to FIGS. 5 and 6, another embodiment of the slider assembly of this invention will be described. The embodiment shown in FIG. 5 is almost similar in construction and function to the preceding embodiment, except that its track rail and slider have different shapes from those of the preceding embodiment. Components with the similar functions are assigned like reference numerals and repetitive explanations omitted.

In a slider assembly 60 shown in FIG. 5, a track rail 69 is shaped more flat than the track rail 22 of FIGS. 1 to 3 and the slider 61 is low compared with the width of track rail 22 to match the shape of the track rail 69. While the overall construction of a stopper 62 is basically the same as that of the stopper 2, an embracing portion 67 comprising leg portions 63 and a bridge portion 64 and engagement portions 68 comprising bent portions 65 and hook portions 66 are modified from those of the previous embodiment according to the shapes of the slider 61 and the track rail 69. Engagement portions 70 formed at the underside of the track rail 69 for engagement with the hook portions 66 of the stopper 62 are provided by the mounting holes 33. Because the track rail 69 has a flat shape, the mounting holes 33 spaced from each other are arranged in lines close to the longitudinal sidewall surfaces 23.

Figure 12:
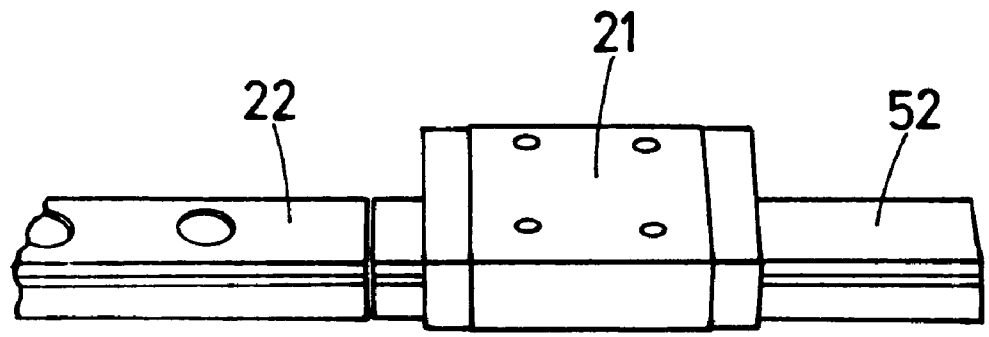
FIG. 12 is an explanatory view showing how the slider is transferred with the insertion member and the track rail put together end to end.

The slider assemblies 1, 60 shown in FIGS. 1 to 3 and FIGS. 5 and 6 have their track rails 22, 69 mounted with the sliders 21, 61 and further attached with the stoppers 2, 62. The track rails 22, 69 may be replaced with dummy track rails or insertion sleeves 52 molded from synthetic resin such as shown in FIG. 12.

Figure 7:
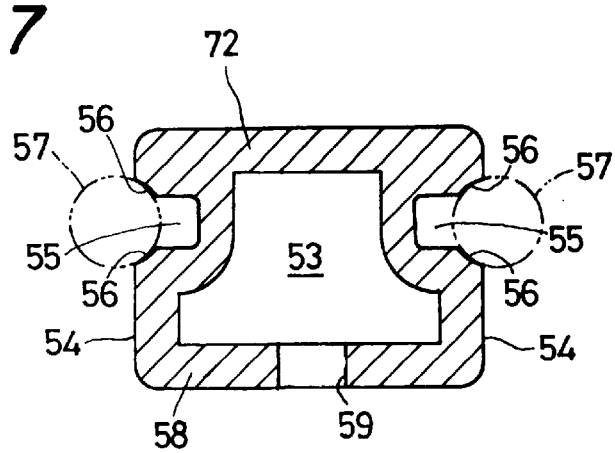
FIG. 7 is a partly cross-sectional view of an insertion sleeve used in a further embodiment of the slider assembly of this invention.
Figure 13:
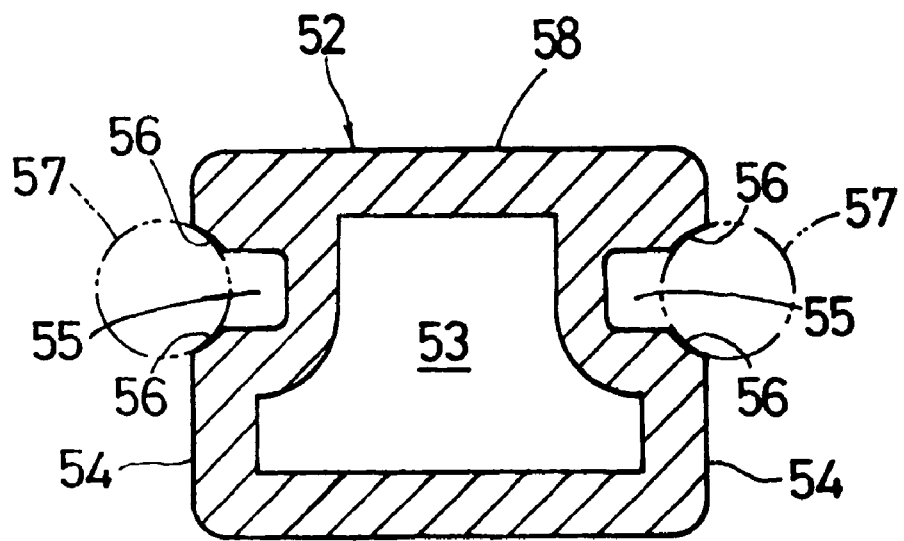
FIG. 13 is a cross section of one example of a molded insertion sleeve.

FIG. 7 is a cross section of an insertion sleeve 72 used in a further embodiment of the slider assembly according to the present invention. As to the slider only the rolling elements 57 are shown. The insertion sleeve 72 used in the embodiment of FIG. 7 is similar to the insertion sleeve 52 shown in FIG. 13, except that the engagement holes 59 as engagement portions are formed in the bottom portion 58 at the widthwise center. Hence its explanation is omitted. The engagement holes 59, like the mounting holes 33 in the previous embodiment shown in FIGS. 1 to 3, are arranged in a longitudinal line and function as engagement portions in which the hook portions of the stopper engage. When a wide insertion sleeve 72 is used, the engagement holes (not shown) are arranged in lines close to the longitudinal sidewall surfaces 54, as with the mounting holes 33 of the track rail 69 shown in FIGS. 5 and 6.

Next, by referring to FIGS. 8 and 9, a further embodiment of the slider assembly of this invention will be explained. The embodiment shown in FIG. 8 has the similar construction and function to those of the embodiment shown in FIG. 1, except for the stopper. Components with identical functions are assigned like reference numbers and their repetitive explanations omitted.

Figure 8:
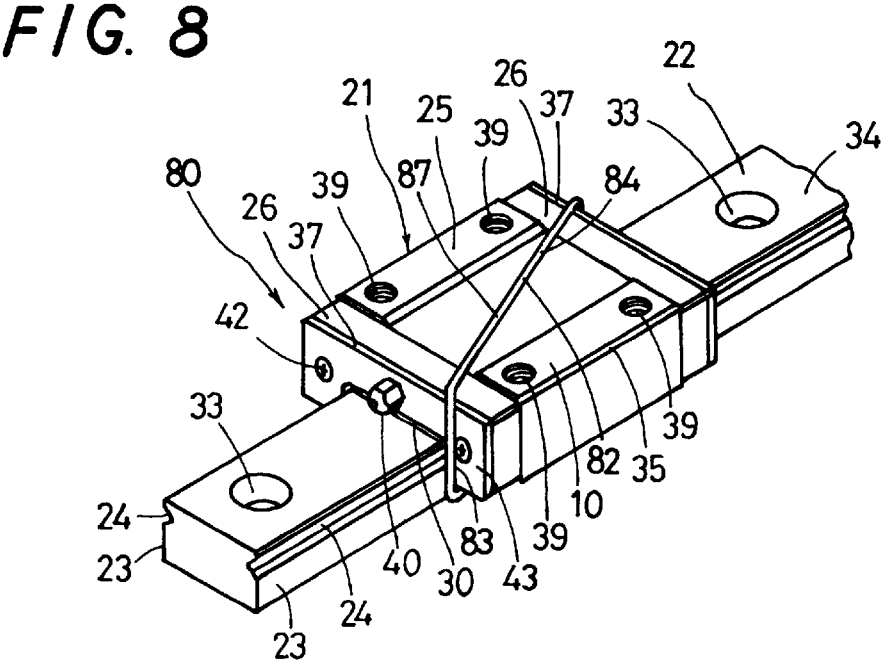
FIG. 8 is a perspective view of a further embodiment of the slider assembly of this invention.
Figure 9:
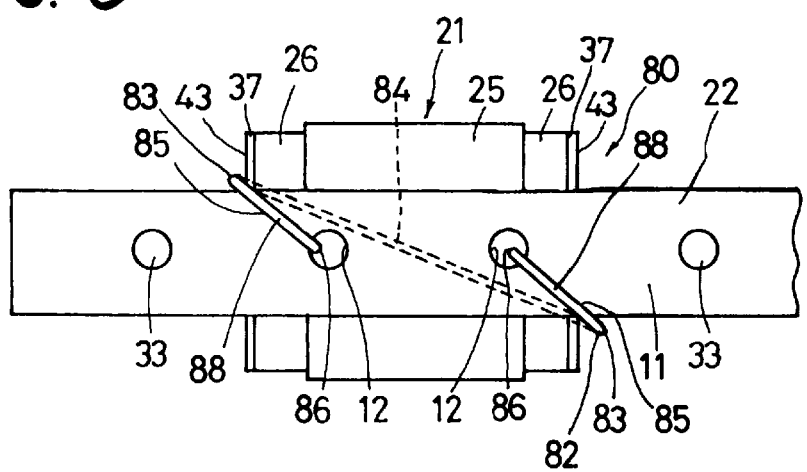
FIG. 9 is a bottom view of the slider assembly of FIG. 8.

In a slider assembly 80 shown in FIGS. 8 and 9, an embracing portion 87 comprises a pair of leg portions 83 and a bridge portion 84. One of the leg portions 83 of the stopper 82 is arranged on one side of the track rail 22 and the other leg portion 83 on the other side of the track rail 22, with the bridge portion 84 running diagonally over the upper surface 10 of the slider 21. The engagement portion 88 comprises bent portions 85 bent at the leg portions 83 and running along the underside of the track rail 22 and hook portions 86 formed at the free ends of the bent portions and adapted to engage in the engagement portions 12 formed in the track rail 22. The function of the stopper 82 is almost similar to those of the stoppers 2, 62. Because the bridge portion 84 is laid diagonally over the slider 21, the stopper 82 provides more reliable engagement with the track rail 22 than do the previous stoppers 2, 62.

In the above embodiments, the track rail 22 and the insertion sleeve 72 as the rail members can be cut short according to the equipment to which the slider assembly is to be applied, or when they are used as samples. Two or more sliders may be mounted on a single long rail member. Further, although the stoppers have been described to be formed of metal wires, they may be made from synthetic resin wires or strip materials. Furthermore, while in the embodiments shown in FIGS. 1 to 3 and FIGS. 5 and 6 the stoppers have been shown to be arranged only on one side of the rail member, they may be arranged on both sides of the rail member as required.

What is claimed is:
1. A slider assembly comprising:
    a rail member having first raceway grooves;
    a slider having second raceway grooves corresponding to the first raceway grooves and mounted on the rail member so as to be slidable relative to the rail member; and
    stoppers attached to the rail member;
    wherein the stoppers include embracing portions extending from one of front and rear end faces, with respect to a slider's sliding direction, of the slider to the other end face so as to embrace the slider and locking portions provided at both ends of the embracing portions and adapted to engage in engagement portions of the rail member;
    wherein the slider is stopped on the rail member when it abuts against the stopper.
2. A slider assembly according to claim 1, wherein the slider has a recessed portion and the second raceway grooves are formed in opposing surfaces of the recessed portion, the rail member is an insertion member to be slidably inserted through the recessed portion of the slider, and the first raceway grooves are formed on a pair of longitudinal sidewall surfaces of the insertion member.
3. A slider assembly according to claim 1, wherein the embracing portions of the stoppers extend from one end face of the slider to the other end face on one side of the rail member.

4. A slider assembly according to claim 1, wherein the embracing portions of the stoppers extend from one end face of the slider on one side of the rail member to the other end face of the slider on the other side of the rail member.

5. A slider assembly according to claim 1, wherein the embracing portions comprise a pair of leg portions extending downward at the front and rear end faces, with respect to the slider's sliding direction, of the slider and bridge portions integrally connecting the paired leg portions and extending astride the upper surface of the slider, and the locking portions comprise bent portions bent at the leg portions and extending along the underside of the rail member and hook portions provided at free ends of the bent portions.

6. A slider assembly according to claim 5, wherein the engagement portions of the rail member are engagement holes provided at the underside of the rail member, and the locking portions are projections engaging in the engagement holes.

7. A slider assembly according to claim 6, wherein the engagement holes double as mounting holes formed in the rail member.

8. A slider assembly according to claim 1, wherein the stoppers are formed of elastically deformable wire.

9. A slider assembly according to claim 1, wherein the rail member is either a track rail, a dummy track rail, or a molded rail member made of synthetic resin and the like.

10. A slider assembly according to claim 1, wherein the slider comprises a casing having the second raceway grooves, rolling elements rolling to travel between the first raceway grooves and the second raceway grooves, end caps secured to both end faces of the casing, and end seals attached to end faces of the end caps.

* * * * *